(12) United States Patent
Miyachi et al.

(10) Patent No.: US 8,630,147 B2
(45) Date of Patent: Jan. 14, 2014

(54) METHOD OF DETERMINING POSITION WHERE WORK IS DONE IN SPACE SURROUNDED BY SURFACES AND WORK RESULT MANAGEMENT DEVICE

(75) Inventors: Masakazu Miyachi, Nagasaki (JP); Tetsuya Yamada, Nagasaki (JP); Satoshi Tasaki, Nagasaki (JP); Masaaki Fujita, Nagasaki (JP); Keiji Ida, Nagasaki (JP); Naoki Suganuma, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 487 days.

(21) Appl. No.: 12/866,369

(22) PCT Filed: Sep. 4, 2009

(86) PCT No.: PCT/JP2009/065466
§ 371 (c)(1),
(2), (4) Date: Sep. 17, 2010

(87) PCT Pub. No.: WO2010/038577
PCT Pub. Date: Apr. 8, 2010

(65) Prior Publication Data
US 2011/0170374 A1 Jul. 14, 2011

(30) Foreign Application Priority Data
Sep. 30, 2008 (JP) ................................ 2008-255492

(51) Int. Cl.
*G01S 3/80* (2006.01)
(52) U.S. Cl.
USPC ........................................................ 367/127

(58) Field of Classification Search
USPC ........................................................ 367/127
See application file for complete search history.

(56) References Cited

U.S. PATENT DOCUMENTS

2005/0150697 A1 7/2005 Altman et al.
2011/0170374 A1* 7/2011 Miyachi et al. ............... 367/127

FOREIGN PATENT DOCUMENTS

| CN | 1719277 A | 1/2006 |
| JP | 63-266376 A | 11/1988 |

(Continued)

OTHER PUBLICATIONS

"Shitsunai GPS Constellation3Di", ITT Inc. <http://www.ittc.co.jp/hproduct/constl/index.htm> date unknown.

(Continued)

*Primary Examiner* — Daniel Pihulic
(74) *Attorney, Agent, or Firm* — Westerman, Hattori, Daniels & Adrian, LLP

(57) ABSTRACT

A position determining method and a work result management device. A position where work is done inside a space surrounded by surfaces is determined, wherein the position where work is done inside the space is a sidewall, wave receivers that receive an acoustic wave signal are placed at three or more points, which are on the same plane substantially parallel to the sidewall but not collinear with one another and whose position coordinates are known. The signal is transmitted from a wave transmitter that transmits an acoustic wave and is placed at the position on the sidewall where work is done, and the respective arrival times of the signal at the three or more wave receivers that are not collinear with one another are measured to determine the position coordinates of the wave transmitter using the arrival times and the position coordinates of the three or more wave receivers.

10 Claims, 14 Drawing Sheets

(56) References Cited

FOREIGN PATENT DOCUMENTS

| JP | 3-251706 A | 11/1991 |
|----|------------|---------|
| JP | 6-222130 A | 8/1994 |
| JP | 9-061513 A | 3/1997 |
| JP | 10-096713 A | 4/1998 |
| JP | 2001-254904 A | 9/2001 |
| JP | 2004-108978 A | 4/2004 |
| JP | 2005-300266 A | 10/2005 |
| JP | 2010-71818 A | 4/2010 |
| TW | I288245 | 10/2007 |
| TW | I298799 | 7/2008 |
| WO | WO 2010038577 A1 * | 4/2010 |

OTHER PUBLICATIONS

International Search Report of PCT/JP2009/065466, Mailing Date of Oct. 20, 2009.

Mexican Office Action dated Sep. 23, 2011, issued in corresponding Mexican Patent Application No. MX/a/20101009408.

Notification of Transmittal of Translation of the International Preliminary Report on Patentability (PCT/IB/338) of International Application No. PCT/JP2009/065466 mailed May 19, 2011 with Forms PCT/IB/373 and PCT/ISA.

Notice of Allowance dated Oct. 9, 2012, issued in corresponding Japanese Patent Application No. 2008-255492, (6 pages). With English Translation.

Chinese Office Action dated Oct. 8, 2012, issued in corresponding Chinese patent application No. 200980106947.8, w/ English translation.

Taiwanese Office Action dated May 24, 2013, issued in corresponding Taiwanese Patent Application No. 098131653, with English translation (9 pages).

Mexican Notice of Allowance dated Mar. 27, 2012, issued in corresponding Mexican application No. MX/a/2010/009408, w/English translation.

Chinese Notice of Allowance dated Jul. 10, 2013, issued in corresponding Chinese application No. 200980106947.8, w/English translation.

* cited by examiner

METHOD OF DETERMINING POSITION WHERE WORK IS DONE IN SPACE SURROUNDED BY SURFACES AND WORK RESULT MANAGEMENT DEVICE

TECHNICAL FIELD

The present invention relates to a working position determining method used for work such as maintenance inspection of an inside space surrounded by surfaces or maintenance inspection of outer walls, and a work result management device. Particularly, it relates to a position determining method for determining where a worker is or an inspection position when the worker enters the inside of a large tank, a boiler furnace, or the like, to do work such as maintenance inspection, and an inspection result management device for managing maintenance inspection results together with position information.

BACKGROUND ART

A boiler furnace used at a thermal power plant needs to be opened during fabrication and periodically after starting operation so that a worker will enter the inside to conduct maintenance inspection. During maintenance inspection, it is necessary to define where an inspection point is, but it is difficult to accurately grasp the inspection point visually because the boiler capacity is large.

Therefore, the height position and lateral position of the inspection point have been conventionally measured using a measuring tape or the like to grasp where the worker is, i.e., a maintenance inspection position. However, not only does this method require a lot of time and manpower to grasp the position, but also some error could occur.

For this reason, use of a method, called a three-dimensional positioning system, to determine the position is conceivable. This method is to calculate distances from three or more positions whose position coordinates are known to a point whose position is to be determined using an acoustic wave from its propagation speed and propagation time in order to determine the position using the distances. Such a three-dimensional positioning system is disclosed in Patent Document 1 and Patent Document 2, for example. Another three-dimensional positioning system for determining the position using laser light instead of the acoustic wave is disclosed in Patent Document 3, for example.

A case where a maintenance inspection position in a boiler furnace is determined using a conventional three-dimensional positioning system will be described with reference to FIG. 14 and FIG. 15.

FIG. 14 is a perspective view illustrating a boiler furnace. Many pipes 102 are attached to a boiler furnace 101 near outer walls thereof as shown in FIG. 14, having a combustion chamber 103 inside thereof, with water wall tubes located along inner wall surfaces thereof.

When the operation of such a boiler furnace 101 is stopped to enable a worker to enter the inside in order to check for reduced thickness or corrosion conditions of the water wall tubes, inspection points need to be determined using the three-dimensional positioning system. Detailed description will be given with reference to FIG. 15.

FIG. 15 is a schematic diagram for explaining a conventional method of determining a position in the boiler furnace 101.

In FIG. 15, numeral 101 denotes the boiler furnace schematically shown. When the position of point A in the boiler furnace 101 is to be determined, wave receivers capable of receiving electric waves and acoustic waves are first placed at three reference positions $R_{101}$, $R_{102}$, and $R_{103}$, whose position coordinates are known, in the boiler furnace 101, respectively. After that, an electric wave and an acoustic wave are transmitted from point A simultaneously, an arrival time interval between the electric wave and the acoustic wave is measured by the wave receivers placed at the three reference positions $R_{101}$, $R_{102}$, and $R_{103}$, respectively, distances $L_{101}$, $L_{102}$, and $L_{103}$ between position A and the respective reference positions $R_{101}$, $R_{102}$, and $R_{103}$ are calculated using the arrival time interval and acoustic velocity, and the position of point A is determined using the distances $L_{101}$, $L_{102}$, and $L_{103}$, and the position coordinates of the reference positions $R_{101}$, $R_{102}$, and $R_{103}$.

However, distances $L_{101}'$, $L_{102}'$, and $L_{103}'$ from point A', which is symmetrical to point A with respect to a plane formed by the three reference positions $R_{101}$, $R_{102}$, and $R_{103}$, to the three reference positions $R_{101}$, $R_{102}$, and $R_{103}$ have the following relations: $L_{101}=L_{101}'$, $L_{102}=L_{102}'$, and $L_{103}=L_{103}'$.

In other words, points to which distances from the three reference positions $R_{101}$, $R_{102}$, and $R_{103}$ are $L_{101}$, $L_{102}$, and $L_{103}$ exist at two positions (A and A'). If the position corresponding to point A' shown in FIG. 15 is located outside the boiler furnace 101, since the position corresponding to point A' can be excluded from candidates for point A, point A can be determined. However, if point A' shown in FIG. 15 is located inside the boiler furnace 101, the position of point A cannot be determined.

In Patent Document 1, since position determination is made on condition that it is known in which direction the point to be determined is positioned with respect to the plane formed by the three reference positions, the point positioned symmetrically to the point to be determined with respect to the plane formed by the three reference positions is not considered. In Patent Document 2, since the three reference positions are located on the ground to determine a position in the air, the point positioned symmetrically to the point to be determined with respect to the plane formed by the three reference positions is located in the ground and hence is not considered as well. Thus, a position in the boiler furnace cannot be always determined even if either of the methods disclosed in Patent Documents 1 and 2 is employed.

Further, the position calculation method disclosed in Patent Document 2 is to obtain distances between a fix and known positions from the arrival times of an acoustic wave, so that the time when the acoustic wave is transmitted from the fix needs counting. To this end, a wave transmitter needs electric wave transmitting means separately to transmit wave transmitting time to an arithmetic unit, resulting in enlargement of equipment. In addition, if a scaffold is set up near a boiler sidewall on which a position is to be determined during inspection or the like in the boiler furnace, the scaffold becomes an obstacle to transmission and reception of the acoustic wave, and it is expected that use of the method disclosed in Patent Document 2 will reduce positioning accuracy.

Further, in the method using laser light as disclosed in Patent Document 3, if there is an obstacle to interrupt laser light between a transmitter and a receiver, measurement is impossible and hence the method is not suited to use for inspection in a boiler furnace where there are many obstacles such as the scaffold at the time of inspection. In addition, since it is dangerous if laser light gets in eyes, laser light intensity is limited.

Further, in order to enable determination of direction to a point (inspection position) to be determined from a plane formed by three points even in the boiler furnace, it is considered, for example, that all the three reference points are placed on the floor surface at the bottom of the boiler furnace. However, when the three reference points are placed on the floor surface, there is the scaffold that becomes an obstacle to acoustic wave propagation between the wave transmitting position and the wave receiving position, causing reduction in positioning accuracy.

In addition, since the capacity of the boiler furnace is large, plural workers enter the inside during major inspection or overhaul. Therefore, although it is necessary to detect inspection positions of the plural workers, any of Patent Documents 1, 2, and 3 is not available for position detection of plural workers.

[Patent Document 1] Japanese Patent Application Laid-Open No. 63-266376

[Patent Document 2] Japanese Patent Application Laid-Open No. 2004-108978

[Patent Document 3] Japanese Patent Application Laid-Open No. 3-251706

SUMMARY OF THE INVENTION

In view of such conventional problems, it is an object of the present invention to provide a position determining method and a work result management device, used for internal inspection of a space surrounded by surfaces such as a boiler furnace and capable of determining a position even in a case where reference points cannot be placed on the floor surface, and further used for internal inspection of a vessel and capable of detecting plural positions.

In order to solve the above-mentioned problems, according to the present invention, there is provided a method of determining a position where work is done in a space surrounded by surfaces, characterized in that the position where work inside the space is done is located on a sidewall, wave receivers capable of receiving an acoustic wave signal are placed at three or more points, which are on the same plane substantially parallel to the sidewall but not collinear with one another and whose position coordinates are known, a signal is transmitted from a wave transmitter capable of transmitting an acoustic wave and placed at a position where work is done on the sidewall in the space, respective arrival times of the signal at the three or more wave receivers are measured, and the position coordinates of the wave transmitter are determined using the arrival times and the position coordinates of the three or more wave receivers.

Since the wave receivers are placed at three or more points, whose position coordinates are known and which are not collinear with one another, two candidates for the position of the wave transmitter (the actual position of the wave transmitter and a position of a mirror image with respect to a plane formed by the three or more wave receivers) are obtained from the arrival times of the acoustic wave at the three or more wave receivers and the position coordinates. However, since a fix is calculated using the wave receivers located at known positions parallel to a sidewall (front wall, back wall, left sidewall, or right sidewall), even if two measurements including the mirror image position are calculated, the height and lateral distance necessary for positioning data are the same, causing no problem. Thus, even in a case where it is difficult to place the wave receivers on the floor surface, a position where work such as maintenance inspection is done can be determined.

In the case of internal inspection of a vessel such as a tank or a boiler furnace, a scaffold is set up near a sidewall in the vessel to do inspection work. In this case, a space with a distance of about 3 to 50 cm between the scaffold and the sidewall is generally formed to inspect the furnace wall, and this space is a place with few obstacles. Use of an acoustic wave in this space enables accurate determination of an inspection position with less influence, on the acoustic wave, of scaffold members or projections on furnace wall even if the scaffold members or the projections on the furnace wall exist between the wave transmitter and the wave receivers. Further, unlike laser light, sound is harmless, and even at work in the furnace, it is applicable because background noise is small in the ultrasonic range.

The method may also be characterized in that wave receivers capable of receiving an electric wave and an acoustic wave are placed at three or more points, which are on the same plane substantially parallel to the sidewall but not collinear with one another and whose position coordinates are known, the electric wave and the acoustic wave are transmitted simultaneously from a wave transmitter placed at a position where work is done on the sidewall in the space, an arrival time interval between the electric wave and the acoustic wave is measured at the three or more wave receivers, respectively, to calculate distances between the wave transmitter and the three or more wave receivers respectively from the arrival time interval, and position coordinates of the wave transmitter are determined using the calculated distances and the position coordinates of the three or more wave receivers.

Since the electric wave velocity is sufficiently high compared with the acoustic wave velocity, the times from when the electric wave and the acoustic wave are transmitted simultaneously from the wave transmitter until the electric wave arrives at the three or more wave receivers, respectively, are sufficiently short, compared with the times from the arrival of the electric wave to the arrival of the acoustic wave, so that it can be treated as zero. Therefore, the times from the arrival of the electric wave to the arrival of the acoustic wave can be treated as the times from when the acoustic wave is transmitted from the wave transmitter until the arrival of the acoustic wave at the wave receivers. In other words, simultaneous transmission of the electric wave and the acoustic wave from the wave transmitter makes it possible to measure the respective arrival times of the acoustic wave from the wave transmitter to the three or more wave receivers, so that the respective distances between the wave transmitter and the three or more wave receivers can be calculated using the times and the acoustic velocity. Then, using the distances and the position coordinates of the three or more wave receivers, the position of the wave transmitter can be determined.

The method may further be characterized in that wave receivers capable of receiving an acoustic wave are placed at three or more points, which are on the same plane substantially parallel to the sidewall in the space but not collinear with one another and whose position coordinates are known, the acoustic wave is transmitted from a wave transmitter placed at a position where work is done on the sidewall in the space, an interval of respective arrival times of the acoustic wave at the three or more wave receivers is measured to calculate a difference in distance between the wave transmitter and the three or more wave receivers respectively from the arrival time interval, and the position coordinates of the wave transmitter is determined using the calculated difference in distance and the position coordinates of the three or more wave receivers.

Thus, the wave transmitter has only to be able to transmit the acoustic wave, enabling the downsizing of the wave transmitter compared with the case of simultaneous transmission of the acoustic wave and the electric wave. Similarly, the size of the wave receivers can also be reduced.

Further, the method may be characterized in that there are plural positions where work is done on a sidewall(s) in the space, and waveform of acoustic waves to be transmitted respectively from the plural positions where work is done vary to identify wave transmitters.

In addition, the method may be characterized in that acoustic waves different in one or more of frequency, wave transmission time, number of wave transmissions, and time difference in wave transmission interval are transmitted from the plural positions where work is done, respectively, to identify wave transmitters.

Since the capacity of a vessel, such as a large tank or a boiler furnace, where internal inspection is conducted is large, if only one worker conducts inspection, it takes a lot of time. Therefore, plural workers enter the inside of the boiler furnace. In this case, each worker needs to grasp an inspection position, which can be identified by the acoustic wave.

Further, the method may be such that the wave receivers are placed at three or more points not collinear with one another in the space, wave transmitters capable of transmitting the acoustic wave are placed at four or more points whose position coordinates are known in the space but not on the same plane, the acoustic wave is transmitted from the four or more wave transmitters, respectively, the arrival times of the acoustic wave transmitted from the four or more wave transmitters to the respective wave receivers are measured to determine the position coordinates of the three or more wave receivers using the arrival times and the position coordinates of the four or more wave transmitters in order to know the position coordinates of the wave receivers, thereby enabling determination of the position where work inside the space is done.

Since the wave receivers need to be placed at the three or more points whose position coordinates in the space are known, the wave receivers may be placed at positions whose position coordinates are known beforehand. In order to receive the electric wave and the acoustic wave over a wide range of positions where work is done in the space, it is preferred to place the wave receivers in locations where it is easy to receive the electric wave and the acoustic wave transmitted from any position in the vessel. However, the position coordinates of the position where it is easy to receive the electric wave and the acoustic wave transmitted from any position in the space are not always known.

Therefore, if the wave receivers are placed in positions where the receiving state is good in the space, and inverse operations are performed using the wave transmitters placed at four points whose position coordinates are known but not on the same plane, the positions of the wave receivers can be determined, thereby improving the detection accuracy of a working position.

This can result in easy determination of the position coordinates of the wave receivers placed in arbitrary locations, so that the wave receivers can be placed in free positions.

Further, the method may be characterized in that a wave transmitter capable of transmitting an acoustic wave is placed at a position where work is done on a sidewall in the space, and wave receivers capable of receiving the acoustic wave are placed on a scaffold provided for passage of a worker with a space from a wall surface on which the wave transmitter is placed.

The wave receivers are thus placed to reduce the possibility of residing an obstacle between the wave receivers and the wave transmitter, improving the accuracy of determining the working position. If the wave receivers are attached directly to the scaffold, or if rod-like attachment members are provided to extend from the scaffold toward the surface so that the wave receivers will be attached to the attachment members, the wave receivers can be placed easily.

There is also provided a device for managing inspection results in a vessel, characterized by comprising: wave receivers capable of receiving a signal and placed at three or more points, which are on the same plane substantially parallel to a sidewall in a space surrounded by surfaces but not collinear with one another and whose position coordinates are known; a wave transmitter capable of transmitting the signal and placed at a position where work is done on the sidewall in the space; and an arithmetic unit for determining position coordinates of the wave transmitter using respective arrival times when the signal transmitted from the wave transmitter arrive at the three or more wave receivers and the position coordinates of the three or more wave receivers, wherein a plurality of the wave transmitters are placed at plural points on a sidewall in the vessel, and respective position information on the plurality of wave transmitters determined by the arithmetic unit and respective work results at the positions of the wave transmitters are transmitted to an external management device to enable the management device to provide centralized management.

Thus, plural pieces of position information and inspection results can be centrally managed automatically, thereby reducing the number of processes performed by a worker.

The device for managing inspection results in a vessel may also be characterized by comprising: wave receivers capable of receiving an electric wave and an acoustic wave and placed at three or more points, which are on the same plane substantially parallel to a sidewall in the space surrounded by surfaces but not collinear with one another and whose position coordinates are known; a wave transmitter capable of transmitting the electric wave and the acoustic wave and placed at a position where work is done on the sidewall in the space; and an arithmetic unit for measuring an arrival time interval between the electric wave and the acoustic wave transmitted from the wave transmitter and arriving at the three or more wave receivers, respectively, to calculate distances between the wave transmitter and the three or more wave receivers respectively from the arrival time interval in order to determine the position coordinates of the wave transmitter using the calculated distances and the position coordinates of the three or more wave receivers, wherein respective position information on a plurality of wave transmitters determined by the arithmetic unit and respective work results at the positions of the wave transmitters are transmitted to an external management device to enable the management device to provide centralized management.

The device for managing inspection results in a vessel may further be characterized in that wave receivers capable of receiving an acoustic wave and placed at three or more points, which are on the same plane substantially parallel to a sidewall in the space surrounded by surfaces but not collinear with one another and whose position coordinates are known; a wave transmitter capable of transmitting the acoustic wave and placed at a position where work is done on the sidewall in the space; and an arithmetic unit for measuring an interval of respective arrival times of the acoustic wave transmitted from the wave transmitter and arriving at the three or more wave receivers to calculate a difference in distance between the wave transmitter and the three or more wave receivers respectively from the arrival time interval in order to determine the position coordinates of the wave transmitter using the calculated difference in distance and the position coordinates of the three or more wave receivers, wherein respective position information on a plurality of wave transmitters determined by the arithmetic unit and respective work results at the positions of the wave transmitters are transmitted to an external management device to enable the management device to provide centralized management.

Further, the device for managing inspection results in a vessel may be characterized in that a plurality of the wave transmitters are placed on a sidewall in the space, and the waveforms of acoustic waves to be transmitted from the plural wave transmitters vary to identify the wave transmitters.

Further, the device for managing inspection results in a vessel may be characterized in that acoustic waves different in one or more of frequency, wave transmission time, number of wave transmissions, and time difference in wave transmission interval are transmitted from the plural wave transmitters, respectively, to identify the wave transmitters.

Further, the device for managing inspection results in a vessel may be characterized in that a wave transmitter capable of transmitting an acoustic wave is placed at a position where work is done on a sidewall in the space, and wave receivers capable of receiving the acoustic wave are placed on a scaffold provided for passage of a worker with a space from a wall surface on which the wave transmitter is placed.

Thus, there can be provided a position determining method and a work result management device, used for internal inspection of a space surrounded by surfaces such as a boiler furnace and capable of determining a position even in a case where reference points cannot be placed on the floor surface, and further used for internal inspection of a vessel and capable of detecting plural positions.

MODES FOR CARRYING OUT THE INVENTION

Preferred embodiments will now be described in detail in an illustrative manner with reference to the drawings. Note that the size, material, shape, and relative position of components described in the embodiments do not limit the scope of this invention unless otherwise particularly mentioned, and the embodiments are just illustrative example.

[Embodiment 1]

The principle of a working position determining method according to Embodiment 1 will be described with reference to FIG. 1, FIG. 2, and FIG. 3.

Figure 1:
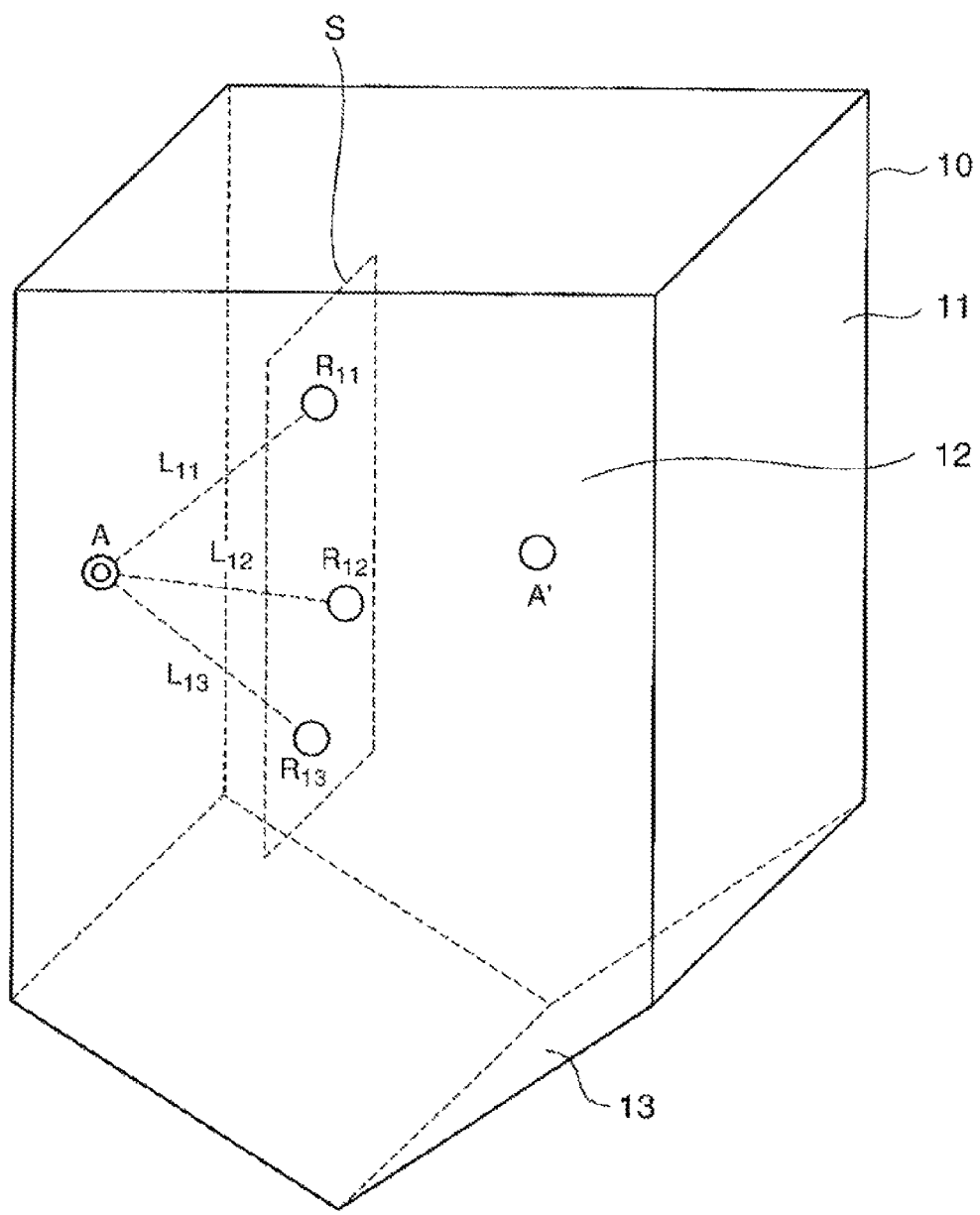
[FIG. 1] It is a schematic diagram for explaining a method of determining a position in a vessel where internal inspection (work) is performed according to Embodiment 1.
Figure 2:
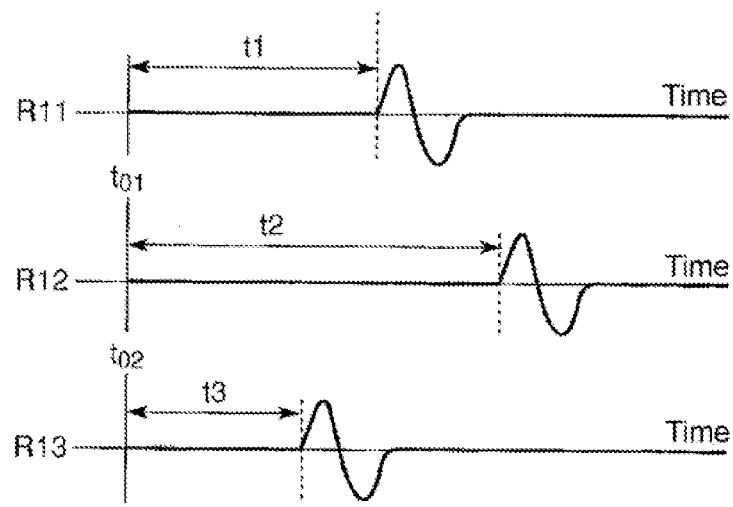
[FIG. 2] It is a graph showing the arrival times of an acoustic wave received at four wave receivers according to Embodiment 1.

FIG. 1 is a schematic diagram for explaining a method of determining a position in a vessel where internal inspection (work) is performed. FIG. 2 is a graph showing the arrival times of an acoustic wave at three wave receivers according to Embodiment 1. FIG. 3 is a graph showing, on x-y-z coordinates, the relationship between the three wave receivers and a point the position of which is to be determined according to Embodiment 1.

In FIG. 1, numeral 10 denotes a schematically shown vessel where internal inspection is conducted. The vessel 10 is constructed substantially of a pair of sidewalls 11 and a pair of back walls 12, which enclose the sides, and inclined planes 13 inclined downward from the respective bottom edges of the pair of sidewalls 11 toward the center of the vessel 10.

When the position of point A on a sidewall 11 in the vessel 10 is to be determined, wave receivers $R_{11}$, $R_{12}$, and $R_{13}$ capable of receiving electric waves and acoustic waves are first placed at three reference positions whose position coordinates are known in the vessel 10. These wave receivers $R_{11}$, $R_{12}$, and $R_{13}$ are placed on the same plane S substantially parallel to the sidewalls 11 in such a manner not to be collinear with one another. Note that point A can be placed on a back wall 12. In this case, the wave receivers $R_{11}$, $R_{12}$, and $R_{13}$ are placed on a plane parallel to the back wall 12.

After that, an electric wave and an acoustic wave are transmitted simultaneously from a wave transmitter provided at point A, and an arrival time interval between the electric wave and the acoustic wave is measured by the wave receivers $R_{11}$, $R_{12}$, and $R_{13}$ placed at the three reference positions to calculate the time interval from when the electric wave and the acoustic wave are transmitted from the wave transmitter until the acoustic wave arrives at the wave receivers $R_{11}$, $R_{12}$, and $R_{13}$ as mentioned below.

A method of calculating times from when the electric wave and the acoustic wave are transmitted from the wave transmitter until the acoustic wave arrives at the wave receivers will be described with reference to FIG. 2.

When the electric wave and the acoustic wave are transmitted from the wave transmitter, the electric wave first arrives at the respective wave receivers $R_{11}$, $R_{12}$, and $R_{13}$. The times from the transmission to the arrival of the electric wave are set as $t_{01}$, $t_{02}$, and $t_{03}$, respectively. Then, the acoustic wave arrives at the wave receivers $R_{11}$, $R_{12}$, and $R_{13}$ after times $t_1$, $t_2$, and $t_3$ pass from the arrival times, $t_{01}$, $t_{02}$, and $t_{03}$, of the electric wave, respectively.

Since the electric wave velocity is sufficiently high compared with the acoustic wave velocity, the times $t_{01}$, $t_{02}$, and $t_{03}$ from when the electric wave and the acoustic wave are transmitted from the wave transmitter until the electric wave arrives at the respective wave receivers $R_{11}$, $R_{12}$, and $R_{13}$ are sufficiently short, compared with the times $t_1$, $t_2$, and $t_3$ from the arrival of the electric wave to the arrival of the acoustic wave, so that it can be treated as zero. Therefore, the times $t_1$, $t_2$, and $t_3$ from the arrival of the electric wave to the arrival of the acoustic wave can be treated as the times from when the acoustic wave is transmitted from the wave transmitter until the arrival of the acoustic wave at the wave receivers.

As a result, if the acoustic velocity in a positioning environment is expressed as c, distances $L_1$, $L_2$, and $L_3$ from the wave transmitter (point A) to the respective wave receiver $R_1$, $R_2$, and $R_3$ can be calculated according to the following equations (1), (2), and (3):

$$L_1 = t_1 \times c \quad (1)$$

$$L_2 = t_2 \times c \quad (2), \text{and}$$

$$L_3 = t_3 \times c \quad (3).$$

The principle of determining point A from distances $L_{11}$, $L_{12}$, and $L_{13}$ from the wave transmitter (point A) to the respective wave receivers $R_{11}$, $R_{12}$, and $R_{13}$ will next be described with reference to FIG. 3.

Figure 3:
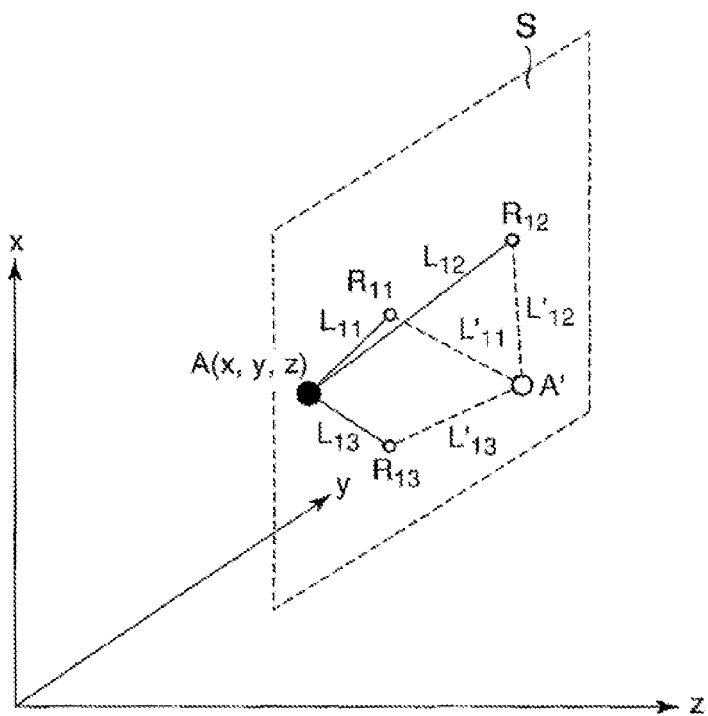
[FIG. 3] It is a graph showing, on x-y-z coordinates, the relationship between the four receivers and a point whose position is to be determined.

In FIG. 3, the position (point A) of the wave transmitter is expressed as (x, y, z), and the positions of the respective wave receivers $R_1$, $R_2$, and $R_3$ are expressed as $(x_1, y_1, z_1)$, $(x_2, y_2, z_2)$, and $(x_3, y3, z_3)$, respectively, as known values.

In this case, the following simultaneous equations (5), (6), and (7) hold true:

$$L_{11}^2 = (x-x_1)^2 + (y-y_1)^2 + (z-z_1)^2 \quad (4),$$

$$L_{12}^2 = (x-x_2)^2 + (y-y_2)^2 + (z-z_2)^2 \quad (5), \text{and}$$

$$L_{13}^2 = (x-x_3)^2 + (y-y_3)^2 + (z-z_3)^2 \quad (6).$$

The simultaneous equations (4), (5), and (6) express spheres with their centers at $R_1$, $R_2$, and $R_3$ and with radiuses of $L_{11}$, $L_{12}$, and $L_{13}$, respectively. Intersecting points of the three spheres are the solutions to the simultaneous equations (4), (5), and (6), and there are two solutions. It is assumed that the two solutions to be found here are expressed (x, y, z) and (x', y', z'). Since the wave receivers $R_{11}$, $R_{12}$, and $R_{13}$ are placed on the same plane parallel to the sidewalls, if the direction perpendicular to the sidewalls is expressed as a z-axis direction, relations x=x', y=y', and z=−z' are established. However, since necessary values are width and height position coordinates (x, y) of the sidewalls, z and z' coordinates can be ignored to determine the position of the wave transmitter.

According to the principle described above with reference to FIG. 1 to FIG. 3, a case where the vessel 10 is a boiler furnace, and a worker enters the inside of the boiler furnace carrying the wave transmitter for transmitting the electric wave and the acoustic wave to do inspection work on water wall tubes provided on the boiler furnace sidewalls will be described as a specific case example of determining the position of the worker. Although the water wall tubes may be provided in a direction perpendicular to or slanting toward the ground, or in a spiral shape, depending on the furnace, the present invention is applicable to any case regardless of the direction and state of installation of water wall tubes.

Figure 4:
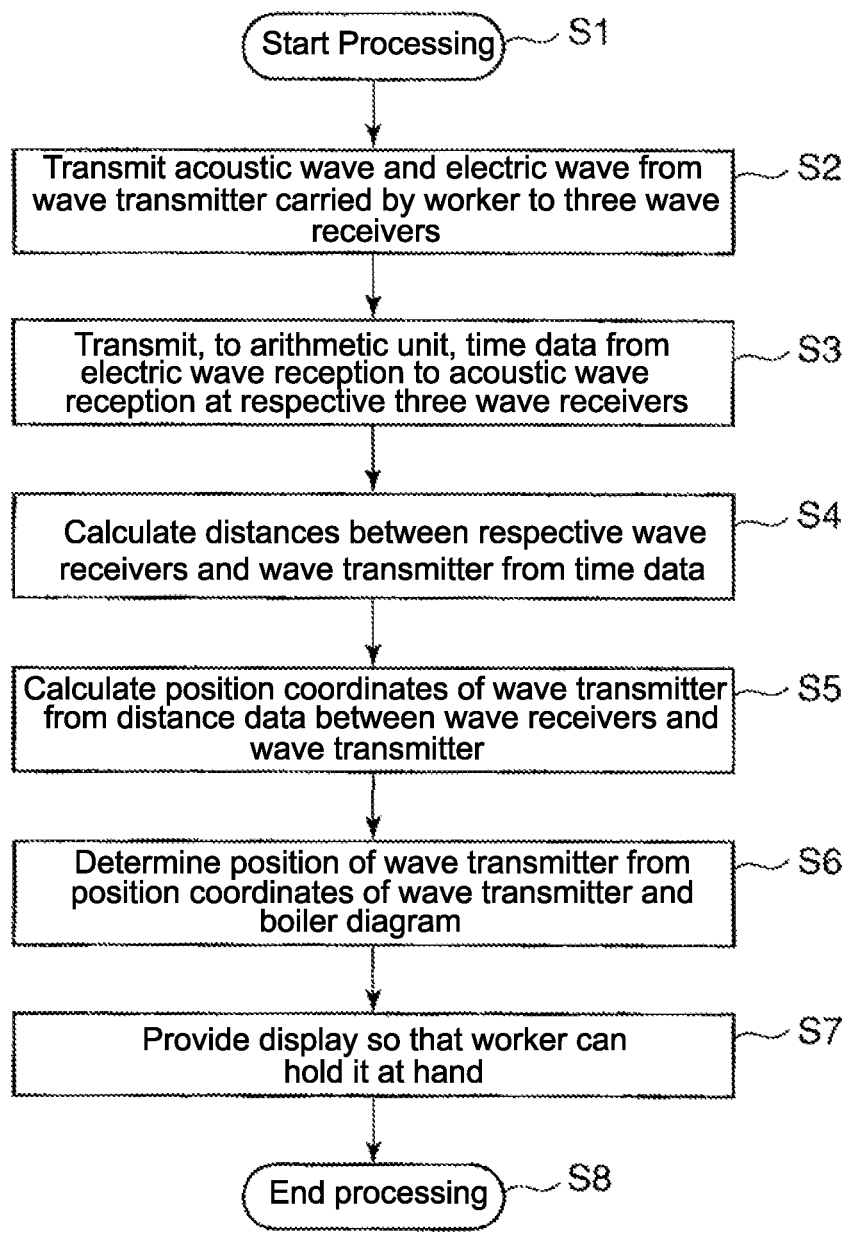
[FIG. 4] It is a flowchart showing a procedure for determining the position of a worker in a boiler furnace.

Referring to FIG. 4, it will be described how to determine the position of the worker in the boiler furnace.

Prior to processing, the wave receivers capable of receiving the acoustic wave signal are placed at three positions, which are on the same plane parallel to a sidewall, where a working position needs to be determined, but not collinear with one another and whose position coordinates are known. In the embodiment, the wave receivers are placed at three positions, but the wave receivers may be placed at four positions or more.

After the processing is started at step S1, the worker enters the inside of the boiler furnace carrying the wave transmitter capable of transmitting the electric wave and the acoustic wave, and transmits the electric wave and the acoustic wave in step S2 from the wave transmitter on the sidewall where inspection work is done.

When the electric wave and the acoustic wave are transmitted in step S2 from the wave transmitter, data on time differences between the reception of the electric wave and the reception of the acoustic wave at the respective three wave receivers whose position coordinates are known are transmitted to an arithmetic unit. The arithmetic unit may be placed anywhere as long as it can receive the data on time differences.

When the data on time differences between the reception of the electric wave and the reception of the acoustic wave are transmitted to the arithmetic unit in step S3, distances between the wave transmitter and the wave receivers are calculated in step S4 by the arithmetic unit using the data on the time differences. The distances can be calculated using equations (1), (2), and (3) mentioned above.

After the distances between the wave transmitter and the respective four wave receivers are calculated in step S4, the position coordinates of the wave transmitter are calculated in step S5. The position coordinates of the wave transmitter can be calculated by finding the solutions of the simultaneous equations (4), (5), and (6) mentioned above.

After the position coordinates of the wave transmitter are calculated in step S5, the position coordinates of the wave transmitter are checked in step S6 using a drawing or the like showing a positional relationship in the boiler furnace to determine the position of the wave transmitter.

After the position of the wave transmitter is determined in step S6, display of position information is so provided in step S7 that the worker can hold it at hand. The position information is provided in such a manner that the results of calculation by the arithmetic unit are transmitted and displayed on a terminal such as a PDA (Personal Digital Assistant) carried by the worker, and processing ends at step S8.

Since the capacity of the boiler furnace is large, if only one worker conducts inspection, it takes a lot of time. Therefore, plural workers enter the inside of the boiler furnace. In this case, in order that each worker may grasp an inspection position, each worker needs identifying.

Figure 5:
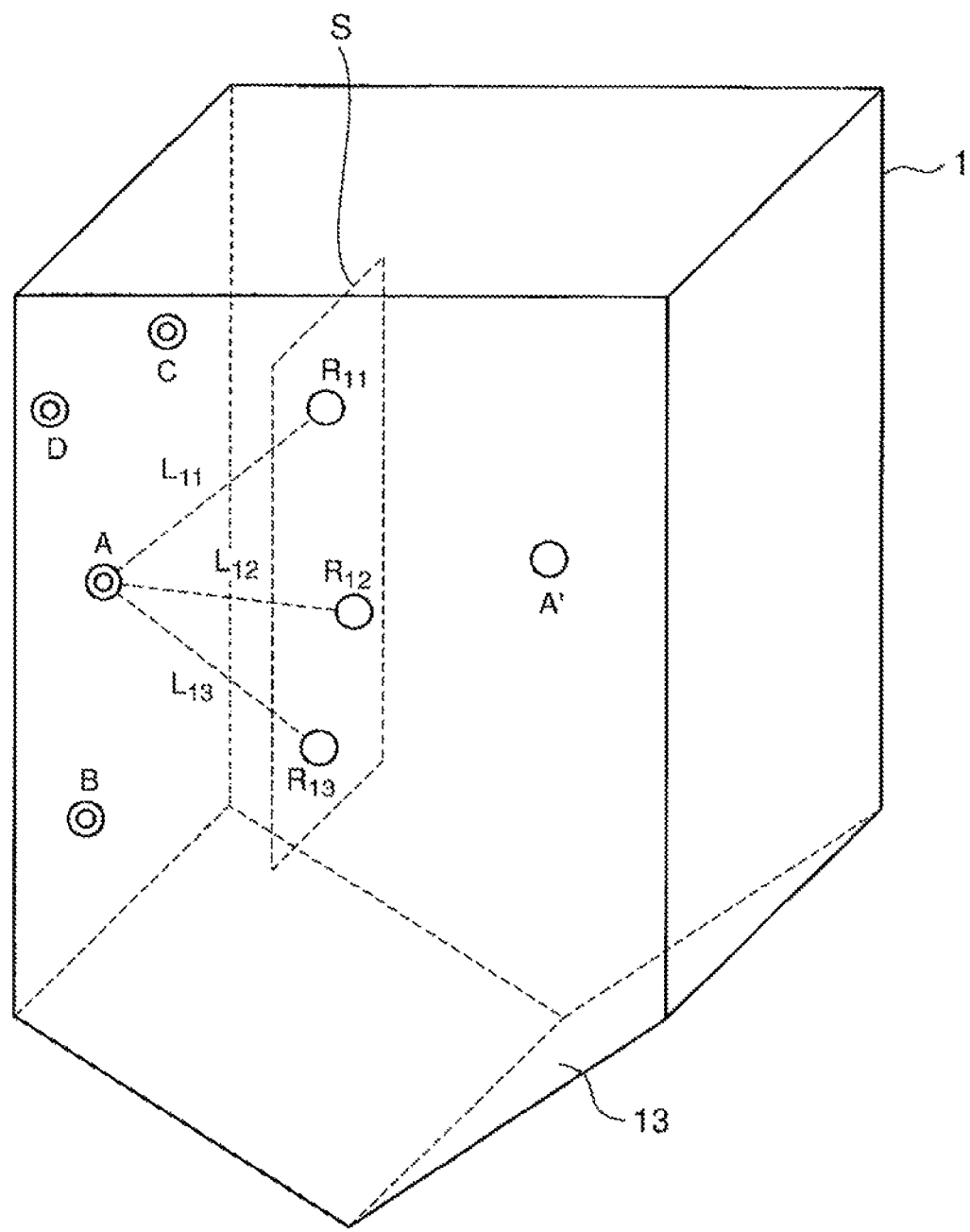
[FIG. 5] It is a schematic diagram for explaining an identification method for plural inspection positions in the boiler furnace.
Figure 6:
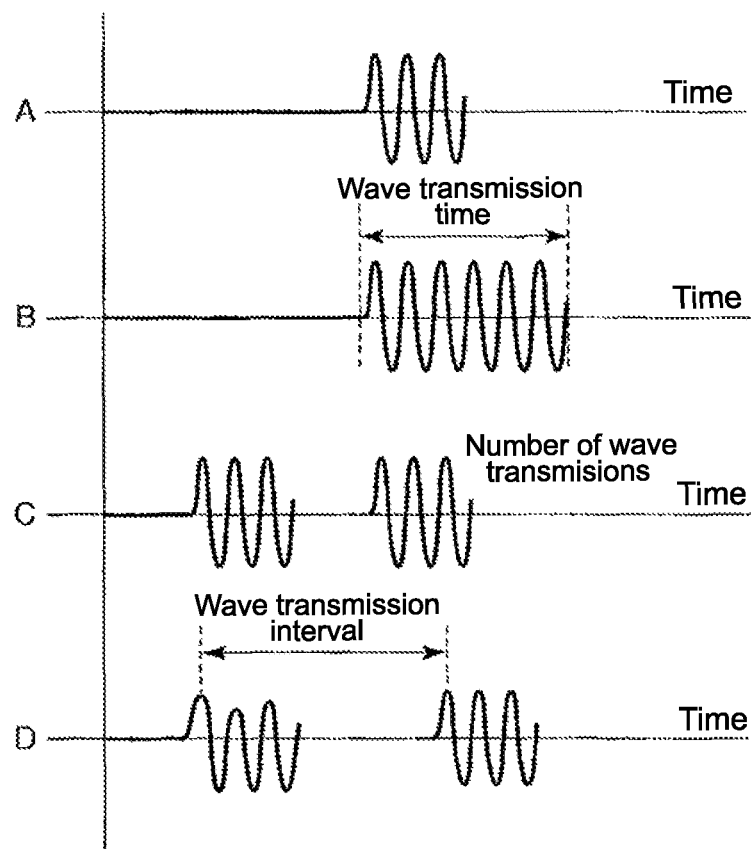
[FIG. 6] It is a diagram showing acoustic waves transmitted from plural inspection positions in the boiler furnace.

Referring to FIG. 5 and FIG. 6, description will be made as to how to identify a worker when plural workers enter the inside of the boiler furnace.

FIG. 5 is a schematic diagram for explaining an identification method for plural inspection positions in the boiler furnace, and FIG. 6 is a diagram illustrating acoustic waves transmitted from plural inspection positions in the boiler furnace.

In FIG. 5, numeral 1 denotes the boiler furnace schematically shown. Suppose that the wave receivers $R_{11}$, $R_{12}$, and $R_{13}$ are placed in the boiler furnace 1 on plane S parallel to the sidewall 11 and whose position coordinates are known, and the positions of points A, B, C, and D on the sidewall 11 need knowing. The wave receivers $R_{11}$, $R_{12}$, and $R_{13}$ are placed in positions whose position coordinates are known. The number of wave receivers is not necessarily limited to three. A number of wave receivers necessary to cover a position measuring range may be placed to determine an inspection position from the received positions of at least three wave receivers.

In this case, the electric wave and the acoustic wave are transmitted from a wave transmitter carried by a worker located at point A to obtain distances ($L_{11}$, $L_{12}$, and $L_{13}$) between the wave transmitter and the wave receivers from the times when they arrive at the wave receivers $R_{11}$, $R_{12}$, and $R_{13}$. Then, the simultaneous equations (4), (5), and (6) are solved so that the position coordinates of point A can be determined. Although the electric wave and the acoustic wave are also transmitted from wave transmitters carried by workers located at points B, C and D, acoustic waves transmitted respectively from points A, B, C, and D vary in terms of wave transmission time, number of wave transmissions, and wave transmission interval time, as shown in FIG. 6, so that it can be identified from which position the acoustic wave was transmitted. In addition to the wave transmission time, the number of wave transmissions, and the wave transmission interval time, any other factor capable of identifying the acoustic wave such as frequency may vary.

Thus, the characteristics of acoustic waves, such as waveform and the like, transmitted from respective wave transmitters vary to enable plural workers to determine their inspection positions at the same time.

Further, the above-mentioned determination of the inspection position is so used that inspection results can be managed easily.

Figure 7:
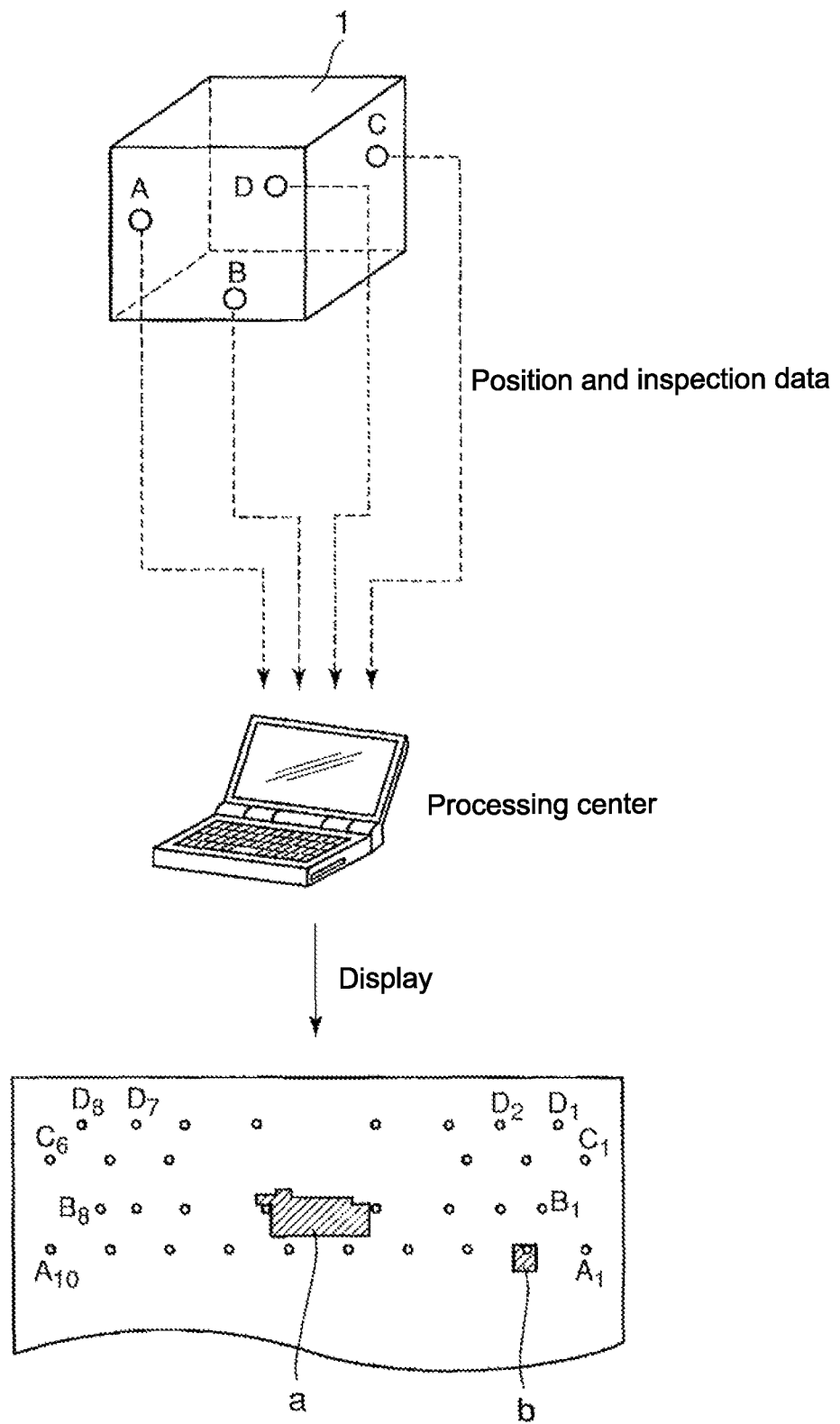
[FIG. 7] It is an explanatory drawing for management of inspection results.
Figure 8:
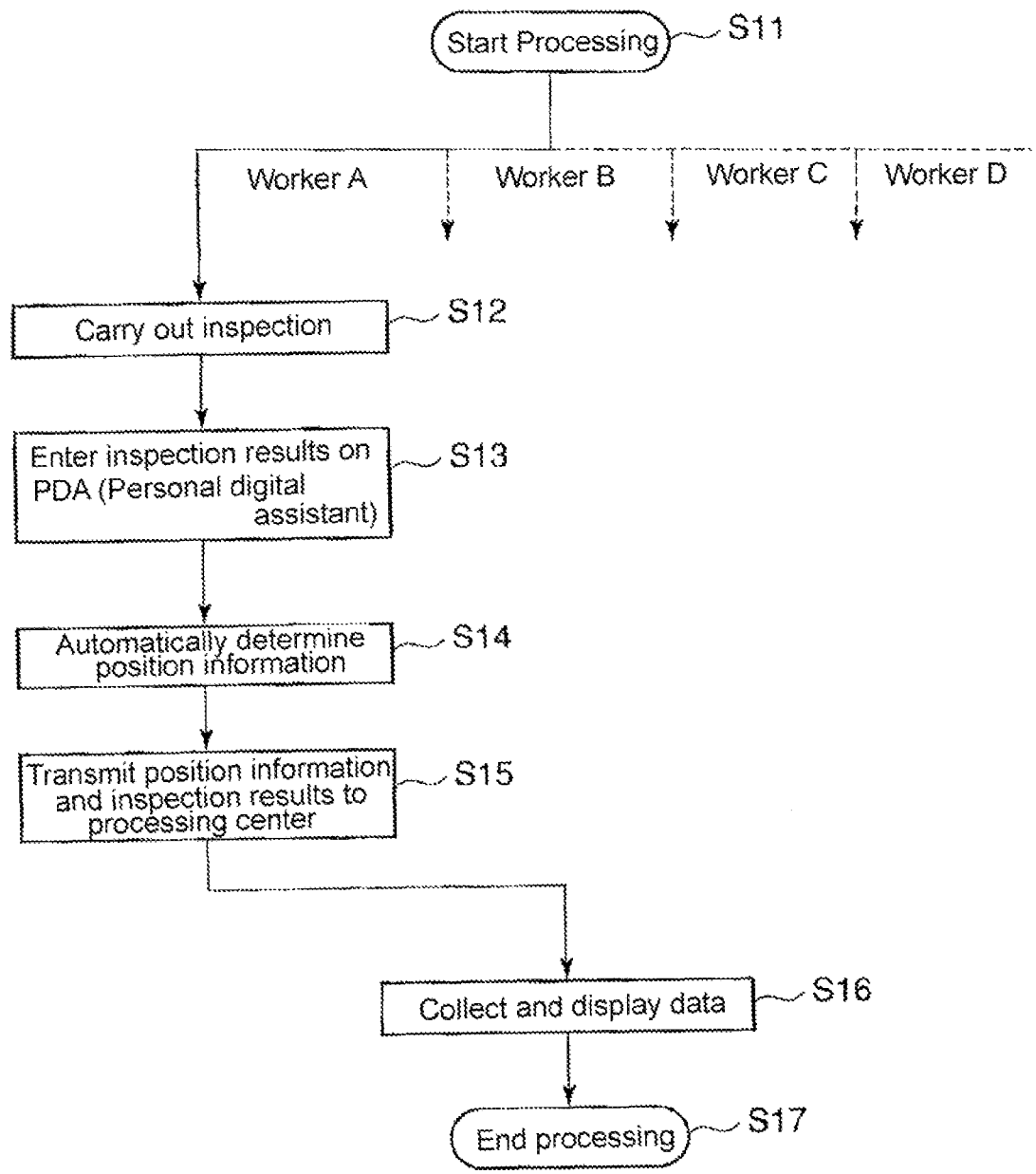
[FIG. 8] It is a flowchart showing a procedure for management of inspection results.

Referring to FIG. 7 and FIG. 8, description will be made of how to manage inspection results.

FIG. 7 is an explanatory drawing for management of inspection results, and FIG. 8 is a flowchart showing a procedure for management of inspection results.

First, an outline of the management of inspection results will be described with reference to FIG. 7.

When inspection is conducted at positions A, B, C, and D in the boiler furnace 1, respective position information and information on inspection results are compiled at a processing center or the like. Then, the compiled results are displayed collectively at the processing center. The displayed results may be transmitted to the workers located at positions A, B, C, and D.

The method of displaying the results may be any display method as long as the positions and the inspection results can be seen. For example, as shown in FIG. 7, visually recognizable display can be provided, such as to hatch areas a and b as positions where inspection results of the wall surface of the boiler furnace are bad or to change the color thereof. Note that A1 to A10, B1 to B8, C1 to C6, and D1 to D8 in FIG. 7 express holes through which wall deslaggers are attached. Since the positions of the holes through which the wall deslaggers are attached are known, the display of inspection results together with the holes through which the wall deslaggers are attached makes it easy to understand the inspection results visually.

A specific method of managing the inspection results will next be described with reference to the flowchart of FIG. 8.

When processing starts at step S11, workers A, B, C, D, . . . carry out inspection in step S12 such as corrosion inspection at positions covered by the workers, respectively. Here, since the details of work done by the respective workers are the same, description will be made only about worker A.

After inspection is carried out in step S12, the worker enters inspection results in step S13 on a PDA (Personal Digital Assistant) carried by the worker.

When the inspection results are entered in step S13, a command is automatically issued in step S14 from the PDA to the wave transmitter carried by the worker to transmit the electric wave and the acoustic wave to automatically identify position information according to the procedure shown in FIG. 4.

The command to transmit the electric wave and the acoustic wave from the wave transmitter may be issued manually by the worker. However, if the command is automatically issued in response to entering the inspection results like in the embodiment, such a human error to forget identification of position information can be prevented.

When the position information is identified in step S14, the position information and the inspection results are sent in step S15 to the processing center where the information is compiled.

In step S16, data sent from respective workers are collectively displayed, and the processing ends at step S17.

[Embodiment 2]

Figure 9:
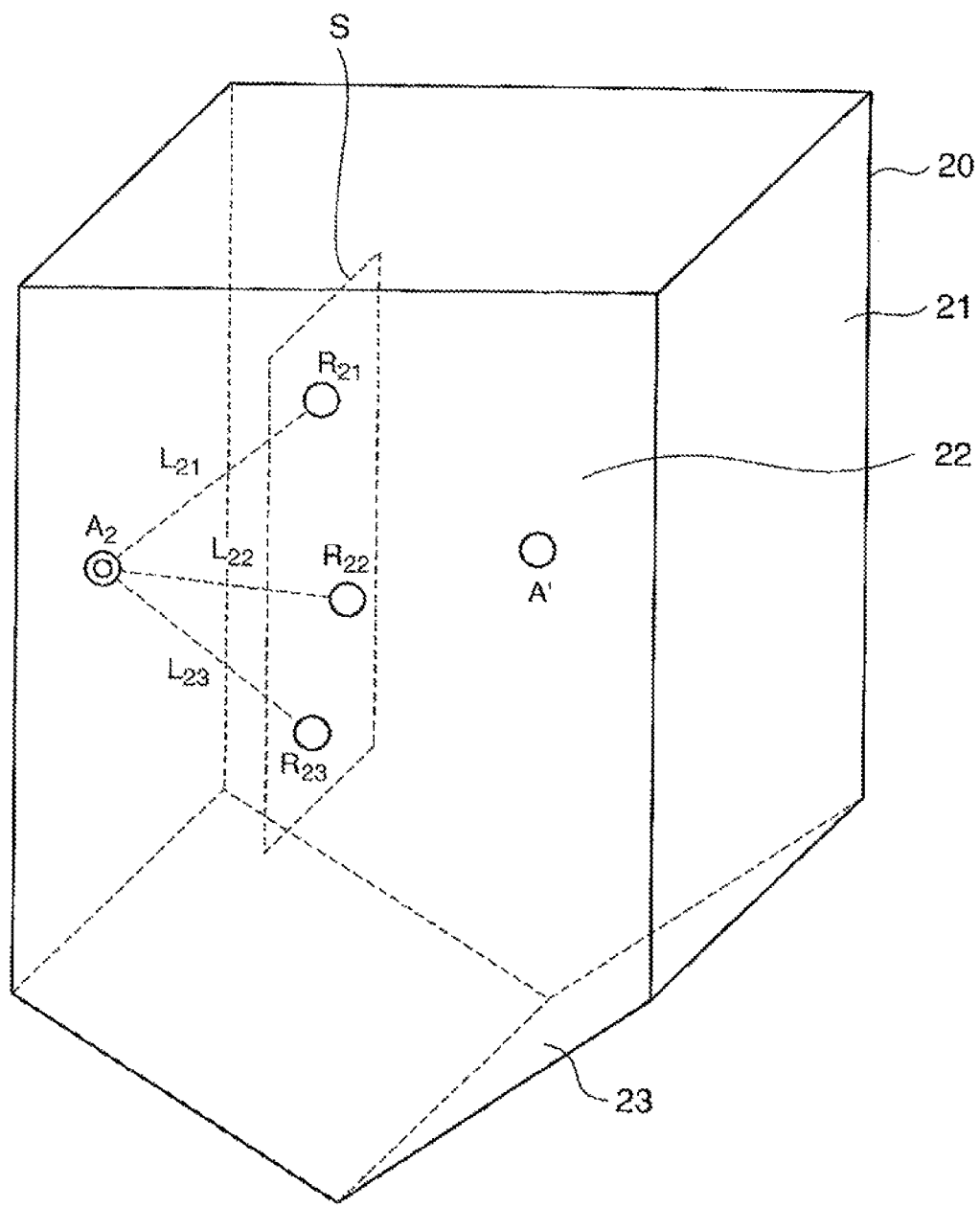
[FIG. 9] It is a schematic diagram for explaining a method of determining a position in a vessel where internal inspection (work) is performed according to Embodiment 2.
Figure 10:
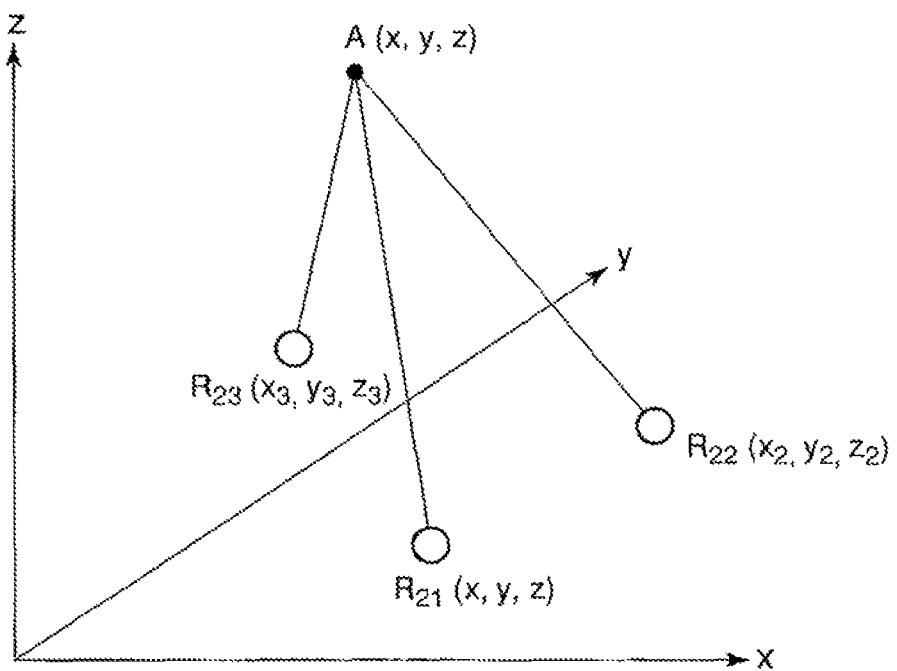
[FIG. 10] It is a graph showing, on x-y-z coordinates, the relationship between four receivers and a point whose position is to be determined according to Embodiment 2.

Referring first to FIG. 9 and FIG. 10, a working position determining method according to Embodiment 2 will be described.

FIG. 9 is a schematic diagram for explaining a method of determining a position in a vessel where internal inspection (work) is conducted according to Embodiment 2. FIG. 10 is a graph showing, on the x-y-z coordinates, a relationship between four wave receivers and a point the position of which is to be determined in Embodiment 2.

In FIG. 9, numeral 20 denotes a schematically shown vessel where internal inspection is conducted. The vessel 20 is constructed substantially of a pair of sidewalls 21 and a pair of back walls 22, which enclose the sides, and inclined planes 23 inclined downward from the respective bottom edges of the pair of sidewalls 21 toward the center of the vessel 20.

When the position of point $A_2$ on a sidewall 21 in the vessel 20 is to be determined, wave receivers $R_{21}$, $R_{22}$, and $R_{23}$ capable of receiving electric waves and acoustic waves are first placed at three reference positions whose position coordinates are known in the vessel 20. These wave receivers $R_{21}$, $R_{22}$, and $R_{23}$ are placed on the same plane S substantially parallel to the sidewalls 21 but not collinear with one another. Point $A_2$ can be placed on a back wall 22. In this case, the wave receivers $R_{21}$, $R_{22}$, and $R_{23}$ are placed on a plane parallel to the back wall 22.

After that, an acoustic wave is transmitted from a wave transmitter provided at point $A_2$, and differences among arrival times of the acoustic wave at the respective wave receivers $R_{21}$, $R_{22}$, and $R_{23}$ placed at the three reference positions are measured.

The principle of determining the wave transmitter (point $A_2$) will next be described with reference to FIG. 10.

In FIG. 10, the position (point $A_2$) of the wave transmitter is expressed as (x, y, z), and the positions of the respective wave receivers wave receiver $R_{21}$, $R_{22}$, and $R_{23}$ are expressed as $(x_1, y_1, z_1)$, $(x_2, y_2, z_2)$, and $(x_3, y_3, z_3)$, respectively, as known values.

As mentioned above, the acoustic wave is transmitted from the wave transmitter (point $A_2$) and received at each of the wave receivers $R_{21}$, $R_{22}$, and $R_{23}$, but the timing of transmission of the acoustic wave is asynchronous among the respective wave receivers.

If acoustic wave propagation times from the wave transmitter (point $A_2$) to the wave receivers $R_{21}$, $R_{22}$, and $R_{23}$ are $t_1$, $t_2$, and $t_3$, respectively, and differences in acoustic wave receiving time between the wave receivers $R_{21}$ and $R_{22}$, $R_{21}$ and $R_{23}$, and $R_{22}$ and $R_{23}$ are $t_{12}$, $t_{13}$, and $t_{23}$, respectively, the following equations (7), (8), and (9) hold true:

$$\pm t_{12} = t_1 - t_2 \tag{7}$$

$$\pm t_{13} = t_1 - t_3 \tag{8}$$

$$\pm t_{23} = t_2 - t_3 \tag{9}$$

As mentioned above, since the timing of transmission of the acoustic wave is asynchronous among the respective wave receivers, $t_1$, $t_2$, and $t_3$ are unknown.

The acoustic wave propagation times $t_1$, $t_2$, and $t_3$ can be expressed by the following equations using acoustic velocity c in a positioning environment:

$$t_1 = \frac{\sqrt{(x-x_1)^2 + (y-y_1)^2 + (z-z_1)^2}}{c}, \quad (10)$$

$$t_2 = \frac{\sqrt{(x-x_2)^2 + (y-y_2)^2 + (z-z_2)^2}}{c}, \quad (11)$$

and $$t_3 = \frac{\sqrt{(x-x_3)^2 + (y-y_3)^2 + (z-z_3)^2}}{c}. \quad (12)$$

When equations (7), (8), and (9) are arranged by substituting equations (10), (11), and (12) thereinto, the differences $t_{12}$, $t_{13}$, and $t_{23}$ in acoustic wave receiving time can be expressed by the following equations (16), (17), and (18) using the coordinates of the wave transmitter (point $A_2$) and the respective wave receivers $R_{21}$, $R_{22}$, and $R_{23}$:

$$\pm t_{12} = \frac{1}{c}\left(\sqrt{(x-x_1)^2 + (y-y_1)^2 + (z-z_1)^2} - \sqrt{(x-x_2)^2 + (y-y_2)^2 + (z-z_2)^2}\right), \quad (13)$$

$$\pm t_{12} = \frac{1}{c}\left(\sqrt{(x-x_1)^2 + (y-y_1)^2 + (z-z_1)^2} - \sqrt{(x-x_3)^2 + (y-y_3)^2 + (z-z_3)^2}\right), \quad (14)$$

and $$\pm t_{12} = \frac{1}{c}\left(\sqrt{(x-x_2)^2 + (y-y_2)^2 + (z-z_2)^2} - \sqrt{(x-x_3)^2 + (y-y_3)^2 + (z-z_3)^2}\right). \quad (15)$$

The simultaneous equations (13), (14), and (15) are solved to obtain the position coordinates (x, y, ±z) of the wave transmitter (point $A_2$), so that the position (x, y) (with z unrelated) of the wave transmitter (point $A_2$) can be determined.

A specific case example of determination of a worker's position according to the principle described above with reference to FIG. 9 and FIG. 10 will be described as a case where the vessel 20 is a boiler furnace, and a worker enters the inside of the boiler furnace carrying a wave transmitter for transmitting acoustic waves to do inspection work of water wall tubes provided on inner wall surfaces of the boiler furnace. Although the water wall tubes may be provided in a direction perpendicular to or slanting toward the ground, or in a spiral shape, depending on the furnace, the present invention is applicable to any case regardless of the direction and state of installation of water wall tubes.

First, wave receivers for receiving an acoustic wave transmitted from the wave transmitter are placed at three positions or more whose position coordinates are known and substantially parallel to a sidewall on which a working position is to be determined. The wave transmitter may be placed at any position as long as its position coordinates are known. For example, a corner of the furnace or a hole through which a wall deslagger is attached can be used.

Figure 11:
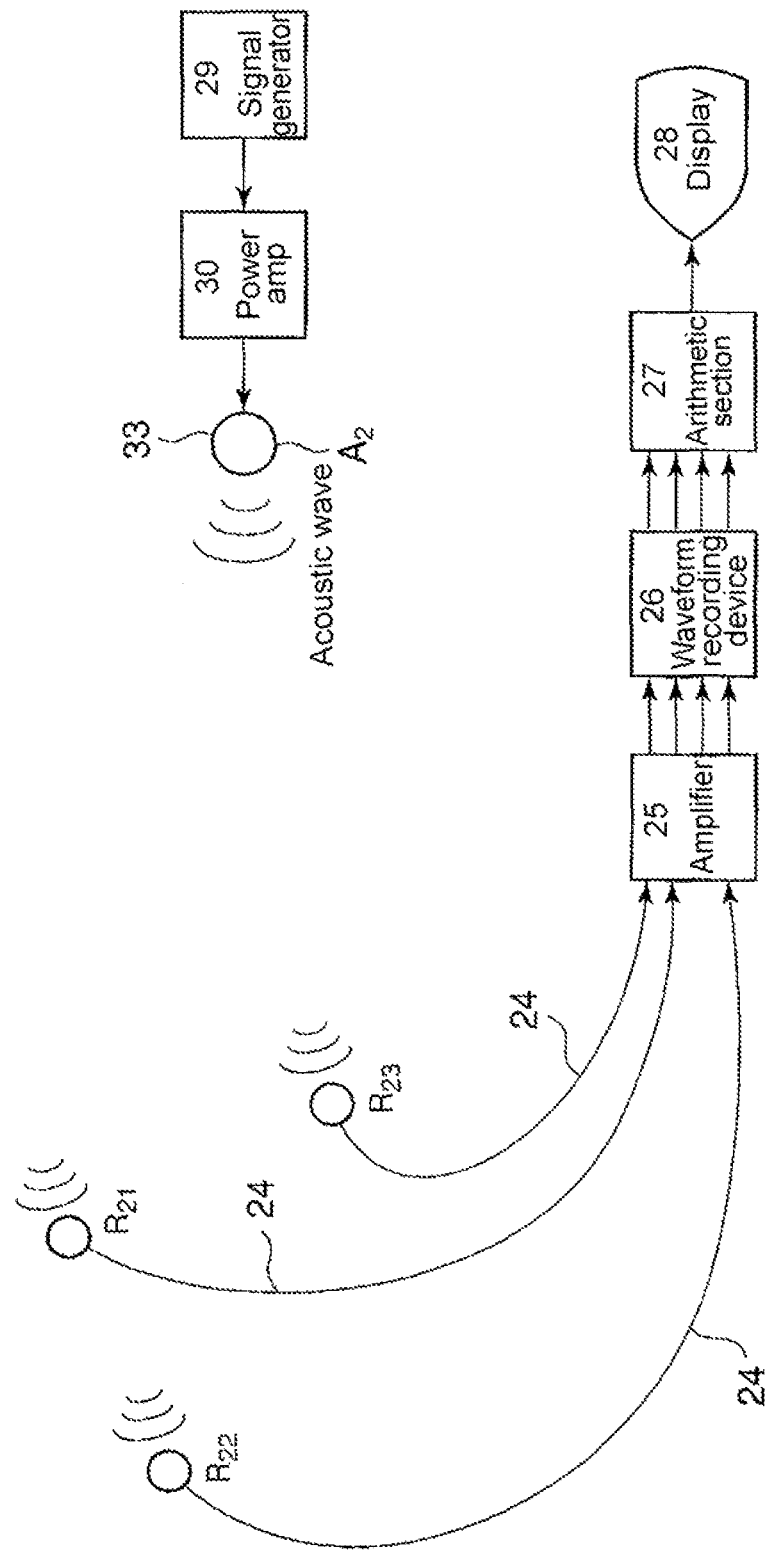
[FIG. 11] It is an explanatory drawing for determination of a working position according to Embodiment 2.

Referring next to FIG. 11, it will be described how to determine a working position in the boiler furnace.

FIG. 11 is an explanatory drawing on determination of a working position according to Embodiment 2.

The worker enters the inside of the boiler furnace carrying the wave transmitter capable of transmitting acoustic waves, and transmits an acoustic wave from the wave transmitter on a sidewall where inspection work is done. The wave transmitter is made up of a signal generator 29, a power amplifier 30, and a wave transmitting section 33, where a signal generated by the signal generator 29 is amplified by the power amplifier 30 and transmitted as an acoustic wave from the transmission section 33.

When the acoustic wave is transmitted from the wave transmitter, the acoustic wave is received at wave receivers $R_{21}$, $R_{22}$, and $R_{23}$ located at three positions whose position coordinates are known, and the received acoustic signal is sent to an amplifier 25 placed outside the boiler furnace through a cable 24. The amplified acoustic signal is sent to and recorded on a waveform recording device 26, and then sent to an arithmetic section 27. In the arithmetic section 27, the position (point $A_2$) of the transmitting section 33 of the wave transmitter is calculated and determined using the above-mentioned equations (13), (14), and (15). Information on the determined position is displayed on a display section 28, and the position information is notified as necessary to the worker through radio communication or the like.

Thus, the wave transmitter and the wave receivers have only to have the function of transmitting and receiving the acoustic wave, respectively, without the need to have the function of transmitting and receiving an electric wave. This can result in simplification of the entire device and hence reduction in the weight of the wave transmitter, so that the burden on the worker who moves carrying the wave transmitter can also be reduced.

Like in Embodiment 1 described with reference to FIG. 7, the position information can be managed together with the inspection results.

Further, like in Embodiment 1, when plural workers enter the inside of the boiler furnace, the acoustic wave from the wave transmitter carried by each worker can vary in terms of waveform such as the wave transmission time, the number of wave transmissions, the wave transmission interval time, etc., respectively, as shown in FIG. 6 to identify each worker.

Figure 12:
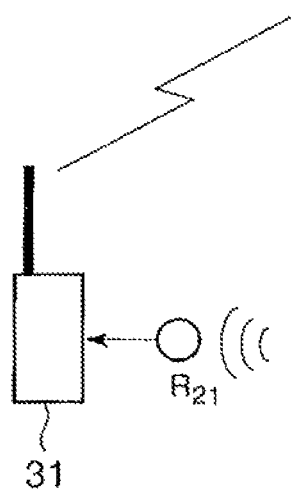
[FIG. 12] It is an explanatory drawing of a modification of working position determination according to Embodiment 2.
Figure 12:
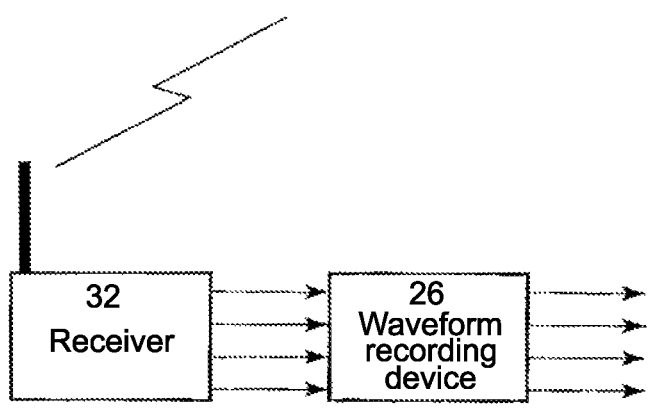

FIG. 12 is an explanatory drawing of a modification of working position determination according to Embodiment 2. Since it is the same as that in FIG. 11 except for the structure from the wave receivers $R_{21}$, $R_{22}$, and $R_{23}$ (only $R_{21}$ shown in FIG. 12) to the waveform recording device 26, the same portions are not illustrated, omitting the description thereof.

The acoustic signal received at the wave receivers $R_{21}$, $R_{22}$, and $R_{23}$ is transmitted by wireless from a transmitter 31 to a receiver 32. The acoustic signal received at the receiver 32 is sent to the waveform recording device 26.

This can eliminate the need for the cable 24, so that the entire device for determining a working position is further simplified.

Figure 13:
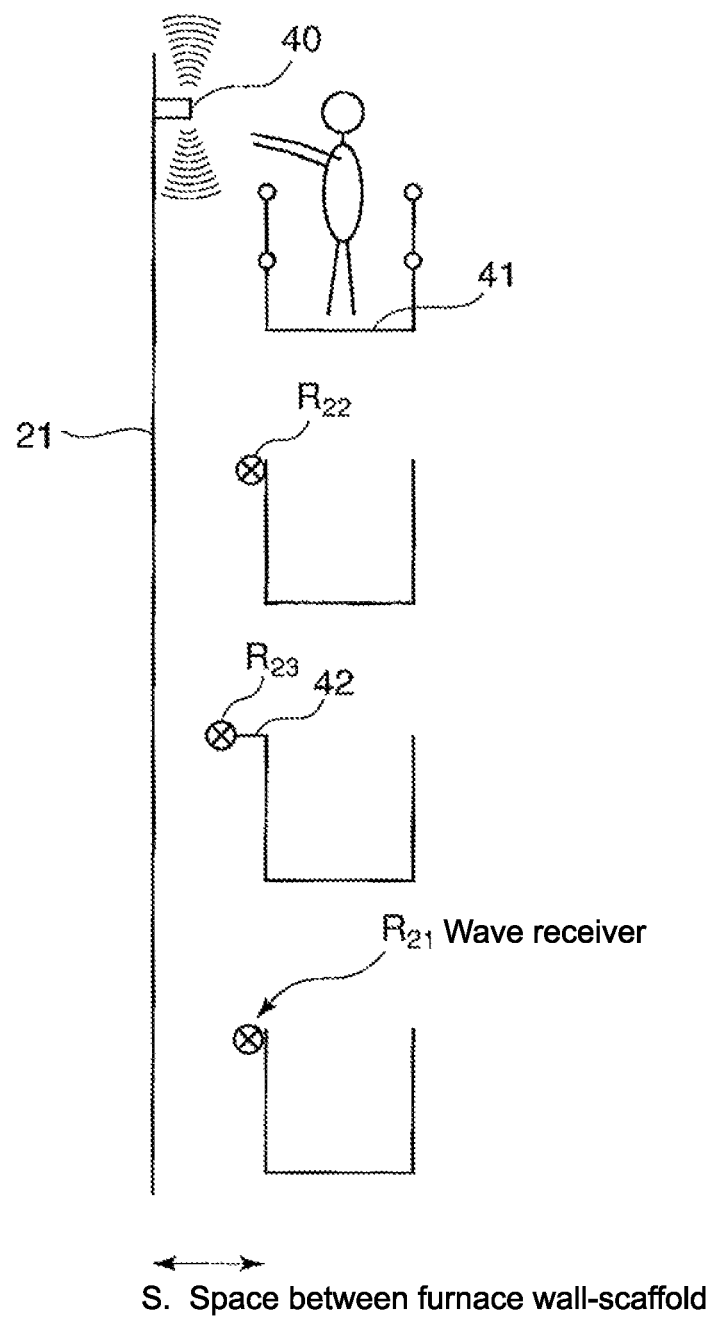
[FIG. 13] It is a schematic diagram showing an example of installation positions of wave receivers according to Embodiment 2.
Figure 14:
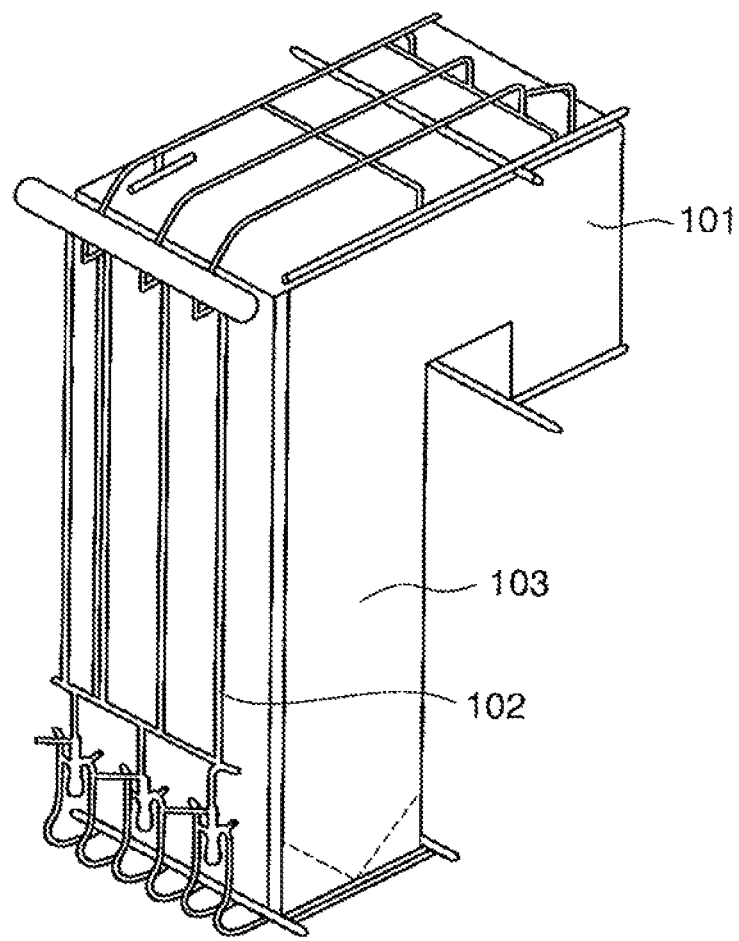
[FIG. 14] It is a perspective view illustrating a boiler furnace.
Figure 15:
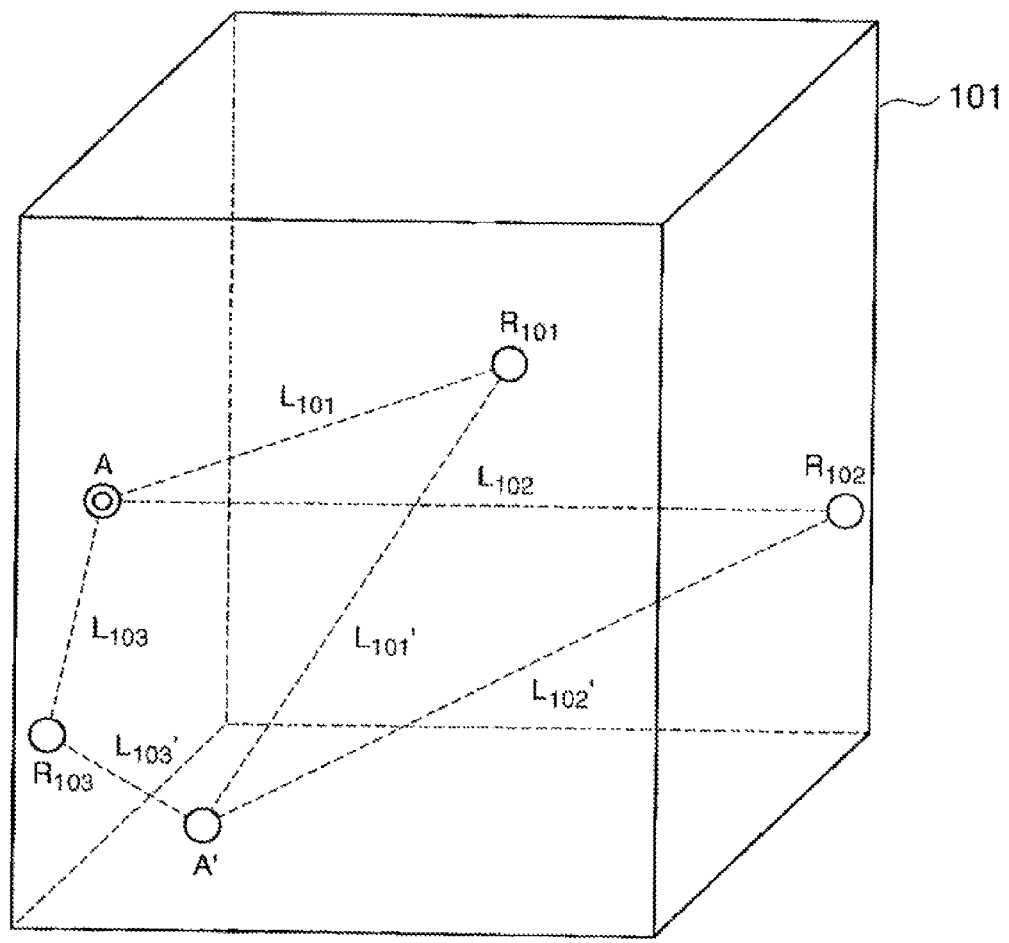
[FIG. 15] It is a schematic diagram for explaining a conventional method of determining a position in a boiler furnace.

FIG. 13 is a schematic diagram showing an example of installation positions of wave receivers according to Embodiment 2. When inspection work of water wall tubes provided on an inner wall surface of a furnace wall 21 is done, a scaffold 41 for passage of a worker and as working space is set up in a position with space S from the furnace wall 21. The space S is a clearance enough to allow the worker to do inspection work of the water wall tubes on the scaffold 41, which is about 3 to 50 cm.

The wave receivers $R_{21}$, $R_{22}$, and $R_{23}$ are placed in space S between the furnace wall 21 and the scaffold 41 and a wave transmitter 40 is placed in a working position to determine the working position. As shown in FIG. 13, it is an easy way to fix the wave receivers $R_{21}$, $R_{22}$, and $R_{23}$ to the scaffold 41.

When the wave transmitter and the wave receivers are placed as shown in FIG. 13, since there is no obstacle between the wave transmitter and the wave receivers, not only can the working position be determined, but also it is easy to attach the wave receivers.

Although Embodiments 1 and 2 are described in the case of inspection of a boiler furnace inner wall, the present invention is also applicable to inspection of a boiler furnace outer wall. In this case, the wave receivers are placed outside the boiler furnace. Since the boiler furnace is generally located in a building, the wave receivers may be placed on an inner wall of the building.

Further, the embodiments are described in the case of the boiler furnace, the present invention is, of course, applicable to inspection of outer wall portions or inner wall portions of a large tank at a chemical plant or the like.

The present invention can be used as a position determining method and a work result management device, used for internal inspection of a space surrounded by surfaces such as a boiler furnace and capable of determining a position even in a case where reference points cannot be placed on the floor surface, and further used for internal inspection of a vessel and capable of detecting plural positions.

The invention claimed is:

1. A method of determining a position where work is done in a space surrounded by surfaces, characterized in that
    the position where work inside the space is done is located on a sidewall,
    wave receivers capable of receiving an acoustic wave signal are placed at three or more points, which are on the same plane substantially parallel to the sidewall but not collinear with one another and whose position coordinates are known,
    a signal is transmitted from a wave transmitter capable of transmitting an acoustic wave and placed at a position where work is done on the sidewall in the space,
    respective arrival times of the signal at the three or more wave receivers not collinear with one another are measured, and
    position coordinates of the wave transmitter are determined using the arrival times and the position coordinates of the three or more wave receivers,
    wherein the wave transmitter capable of transmitting the acoustic wave is placed at the position where work is done on the sidewall in the space, and wave receivers capable of receiving the acoustic wave are placed on a scaffold provided for passage of a worker with a space from a wall surface on which the wave transmitter is placed.

2. The method of determining a position where work is done in a space surrounded by surfaces according to claim 1, characterized in that
    wave receivers capable of receiving an electric wave and an acoustic wave are placed at three or more points, which are on the same plane substantially parallel to the sidewall but not collinear with one another and whose position coordinates are known,
    the electric wave and the acoustic wave are transmitted simultaneously from a wave transmitter placed at a position where work is done on the sidewall in the space,
    an arrival time interval between the electric wave and the acoustic wave is measured at the three or more wave receivers, respectively, to calculate distances between the wave transmitter and the three or more wave receivers respectively from the arrival time interval, and
    position coordinates of the wave transmitter are determined using the calculated distances and the position coordinates of the three or more wave receivers.

3. The method of determining a position where work is done in a space surrounded by surfaces according to claim 1, characterized in that
    wave receivers capable of receiving an acoustic wave are placed at three or more points, which are on the same plane substantially parallel to the sidewall in the space but not collinear with one another and whose position coordinates are known,
    the acoustic wave is transmitted from a wave transmitter placed at a position where work is done on the sidewall in the space,
    an interval of respective arrival times of the acoustic wave at the three or more wave receivers is measured to calculate a difference in distance between the wave transmitter and the three or more wave receivers respectively from the arrival time interval, and
    position coordinates of the wave transmitter are determined using the calculated difference in distance and the position coordinates of the three or more wave receivers.

4. The method of determining a position where work is done in a space surrounded by surfaces according to any one of claims 1 to 3, characterized in that
    there are plural positions where work is done on a sidewall in the space, and
    waveform of acoustic waves to be transmitted respectively from the plural positions where work is done vary to identify wave transmitters.

5. The method of determining a position where work is done in a space surrounded by surfaces according to claim 4, characterized in that acoustic waves different in one or more of frequency, wave transmission time, number of wave transmissions, and time difference in wave transmission interval are transmitted from the plural positions where work is done, respectively, to identify wave transmitters.

6. A work result management device for an internal space surrounded by surfaces, characterized by comprising:
    wave receivers capable of receiving a signal and placed at three or more points, which are on the same plane substantially parallel to a sidewall in the space surrounded by the surfaces but not collinear with one another and whose position coordinates are known;
    a wave transmitter capable of transmitting the signal and placed at a position where work is done on the sidewall in the space; and
    an arithmetic unit for determining position coordinates of the wave transmitter using respective arrival times when the signal transmitted from the wave transmitter arrive at the three or more wave receivers and the position coordinates of the three or more wave receivers,
    wherein a plurality of the wave transmitters are placed at plural points on a sidewall in a vessel, and
    respective position information on the plurality of wave transmitters determined by the arithmetic unit and respective work results at the positions of the wave transmitters are transmitted to an external management device to enable the management device to provide centralized management, and
    a wave transmitter capable of transmitting an acoustic wave is placed at the position where work is done on the sidewall in the space, and wave receivers capable of receiving the acoustic wave are placed on a scaffold provided for passage of a worker with a space from a wall surface on which the wave transmitter is placed.

7. The work result management device for an internal space surrounded by surfaces according to claim 6, characterized by comprising:

wave receivers capable of receiving an electric wave and an acoustic wave and placed at three or more points, which are on the same plane substantially parallel to a sidewall in the space surrounded by the surfaces but not collinear with one another and whose position coordinates are known;

a wave transmitter capable of transmitting the electric wave and the acoustic wave and placed at a position where work is done on the sidewall in the space; and an arithmetic unit for measuring an arrival time interval between the electric wave and the acoustic wave transmitted from the wave transmitter and arriving at the three or more wave receivers, respectively, to calculate distances between the wave transmitter and the three or more wave receivers respectively from the arrival time interval in order to determine position coordinates of the wave transmitter using the calculated distances and the position coordinates of the three or more wave receivers, wherein respective position information on a plurality of wave transmitters determined by the arithmetic unit and respective work results at the positions of the wave transmitters are transmitted to an external management device to enable the management device to provide centralized management.

8. The work result management device for an internal space surrounded by surfaces according to claim 6, characterized by comprising:

wave receivers capable of receiving an acoustic wave and placed at three or more points, which are on the same plane substantially parallel to a sidewall in the space surrounded by the surfaces but not collinear with one another and whose position coordinates are known;

a wave transmitter capable of transmitting the acoustic wave and placed at a position where work is done on the sidewall in the space; and an arithmetic unit for measuring an interval of respective arrival times of the acoustic wave transmitted from the wave transmitter and arriving at the three or more wave receivers to calculate a difference in distance between the wave transmitter and the three or more wave receivers respectively from the arrival time interval in order to determine position coordinates of the wave transmitter using the calculated difference in distance and the position coordinates of the three or more wave receivers, wherein respective position information on a plurality of wave transmitters determined by the arithmetic unit and respective work results at the positions of the wave transmitters are transmitted to an external management device to enable the management device to provide centralized management.

9. The work result management device for an internal space surrounded by surfaces according to any one of claims 6 to 8, characterized in that a plurality of the wave transmitters are placed on a sidewall in the space, and acoustic waves to be transmitted from the plural wave transmitters vary in terms of waveform or wave transmission interval to identify the wave transmitters.

10. The work result management device for an internal space surrounded by surfaces according to claim 9, characterized in that acoustic waves different in one or more of frequency, wave transmission time, number of wave transmissions, and time difference in wave transmission interval are transmitted from the plural wave transmitters, respectively, to identify the wave transmitters.

* * * * *